April 23, 1946. C. ARNE Re. 22,745

AUTOMATIC LOCK GATE

Original Filed Oct. 16, 1944 2 Sheets-Sheet 1

Inventor:
Christian Arne,
By Clinton, Wills, Schroeder,
Merriam & Hofgren, Att'ys.

April 23, 1946. C. ARNE Re. 22,745

AUTOMATIC LOCK GATE

Original Filed Oct. 16, 1944 2 Sheets-Sheet 2

Inventor:
Christian Arne,
By Christton, Wiles, Schroeder,
Merriam & Hofgren, Attys.

Reissued Apr. 23, 1946

Re. 22,745

UNITED STATES PATENT OFFICE 22,745

AUTOMATIC LOCK GATE

Christian Arne, Chicago, Ill.

Original No. 2,375,739, dated May 8, 1945, Serial No. 558,801, October 16, 1944. Application for reissue January 12, 1946, Serial No. 640,689

10 Claims. (Cl. 61—26)

This invention relates to an automatic lock gate and more particularly to a floating gate which automatically submerges upon equalization of the water levels on the downstream and upstream sides, and which automatically re-elevates at the appropriate time.

Figure 1:
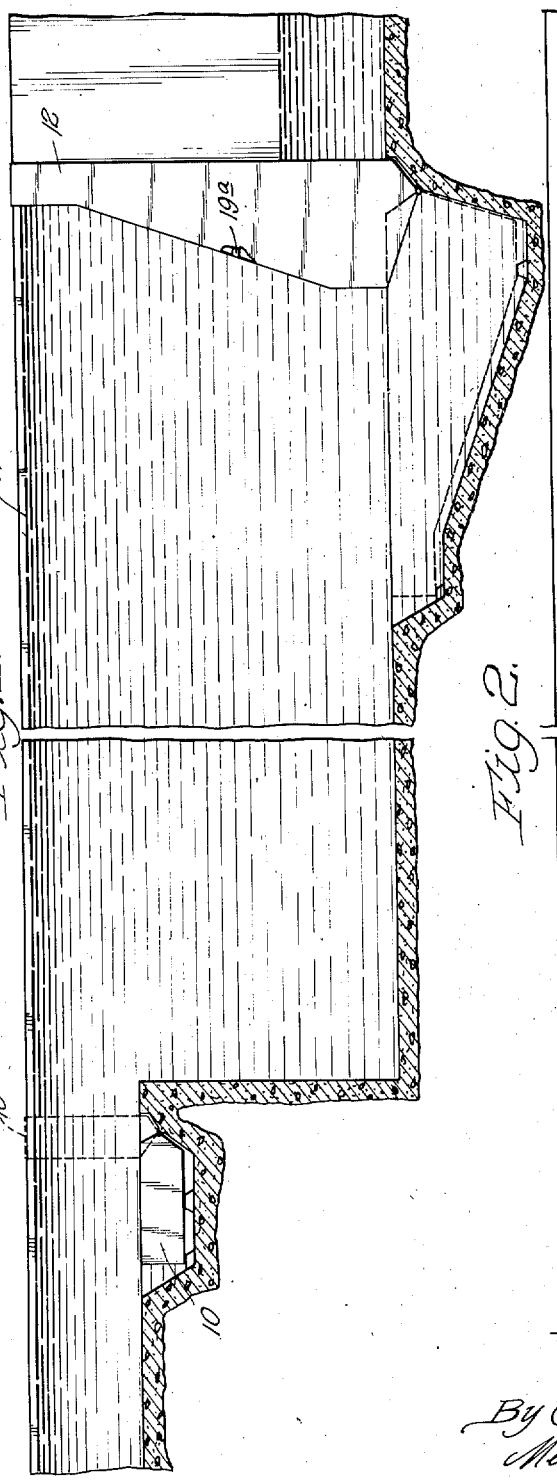
Figure 2:
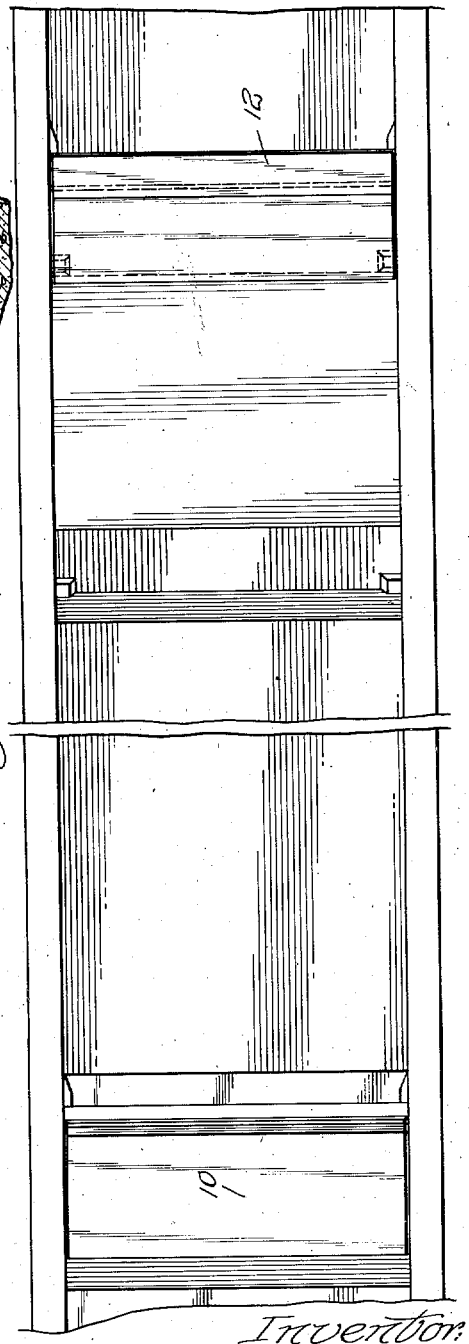
Figure 3:
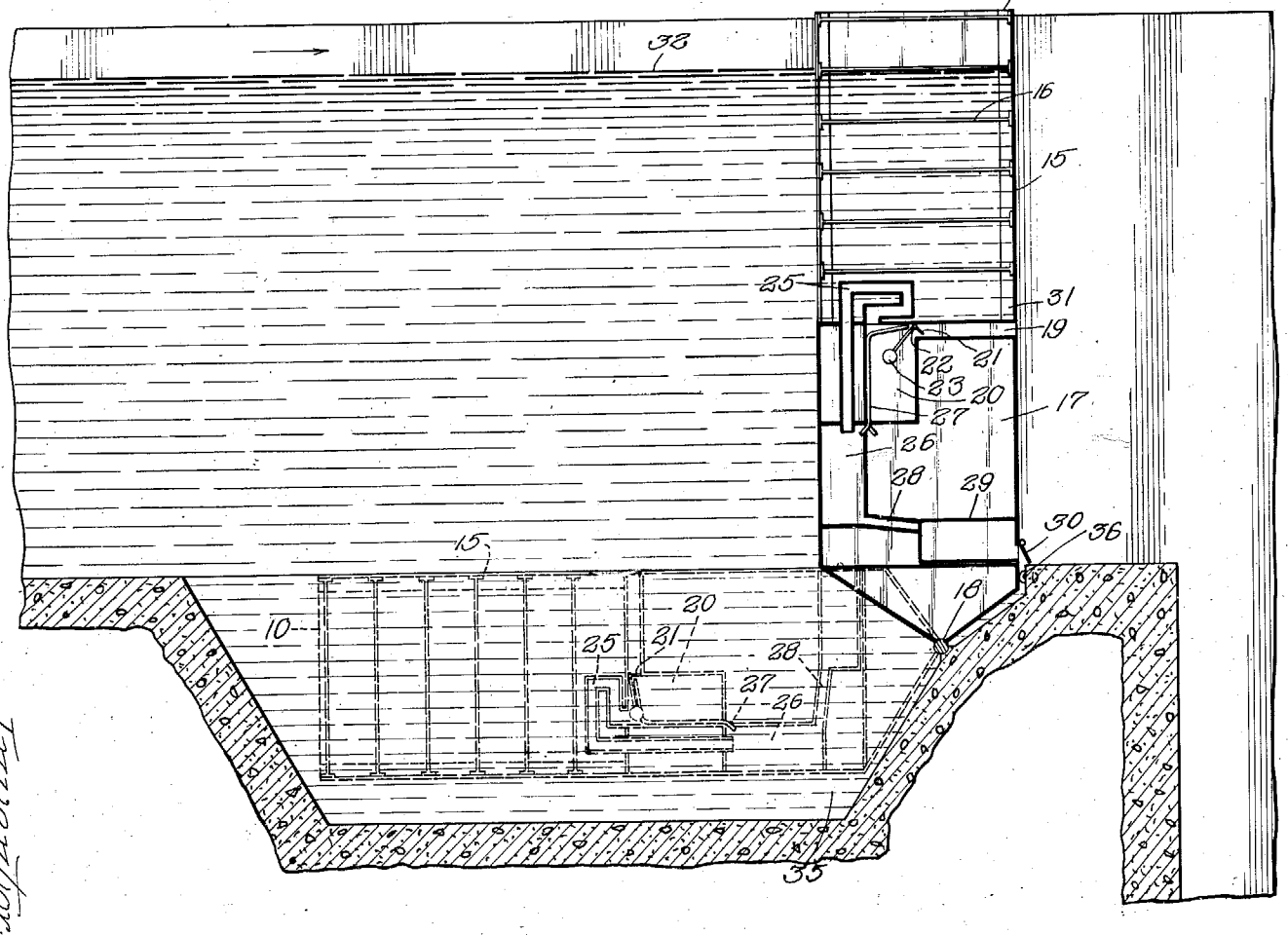

The invention is illustrated in the drawings, in which Fig. 1 is a side elevation of a lock system, broken away in the center; Fig. 2 is a corresponding plan view; and Fig. 3 is an enlarged side elevation of the upper lock gate.

As will be seen from the drawings, the lock system comprises an upper lock gate 10, a lock basin 11, and a lower lock gate 12. The operation of the upper lock gate will be explained in detail and is shown in detail; whereas the operation of the lower lock gate is upon the same principle and is not illustrated in detail.

The gate comprises a wall 15 having rearwardly extending stiffening members 16 in its upper portion. In its lower portion is a float chamber 17 fluid-tight and filled with air. The float chamber is of such capacity that the gate at any stage of the water between high and low water marks, and with the water level equal on both sides, will rise to an upright position, being pivoted upon the hinge 18 which is transverse of the stream. The mechanism for lowering the gate comprises an inlet 19 on the control side of the gate, which, in the instance of the upper gate, is the downstream side. In the case of the lower gate, the control opening is on the upstream side of the gate. In both instances of course the control is from the lock basin side. The inlet 19 communicates with a primary storage chamber 20 which is located on the upstream side of the pivot and at a considerable distance above the pivot to provide as large as possible a moment arm to water which may enter it. The opening 19 is located immediately below the low water mark of the stream. Suitable means are provided for closing the opening 19 when the water level in the primary storage chamber has risen to the appropriate point. As illustrated, this comprises a check valve 21 pivoted at 22 and controlled by the float 23 within the storage chamber.

The chamber 20 is connected by a syphon 25 to the secondary storage chamber 26 which is likewise located on the upstream side of the pivot, but at a point substantially closer to the pivot so that the moment of the water therein contained is substantially less than that in the primary storage chamber, when the gate is in a horizontal position. A vent tube 27 connects the upper downstream portion of the vent chamber 29 through secondary storage chamber 26 and drain 28, with the upper downstream portion of the primary storage chamber 20. A check valve 30 opening outwardly and located at the lowest point where downstream water will recede from it serves as an outlet for the vent chamber.

The vent 27 is also connected to the float chamber 17 so that the air driven out of chamber 20 may enter the larger chamber 17 as well as the secondary storage chamber 26 and vent chamber 29. Thus, when chamber 20 is filled with water, a low air pressure is built up, and when the water is emptied from chamber 29, the air pressure is restored to normal.

The operation of the gate is best illustrated in Figure 3. With the gate 10 in upright position, the lock basin 11 is filled to the line 31 which indicates a low water mark in the river bed. As soon as it reaches the opening 19, water flows into the primary storage chamber and fills it nearly to the top, at which point the float 23 closes the check valve 21. Water continues to rise in the lock basin until the water levels on the upstream and downstream sides are equal. If the water happens to be at low water mark, this will occur when the water has reached the mark 21. The water, as shown in Fig. 3, is indicated at high water, as shown by the line 32 and accordingly the water in the lock basin will rise to an equal level. When this occurs there is no longer any downstream pressure on the gate. The water in the primary storage chamber has sufficient moment to overcome the normal balance of the gate at any stage from low to high water mark and, accordingly, as soon as the pressure is removed, the gate will begin to settle into the basin 35. When it reaches the bottom of the basin, the syphon 25 is charged by the water in the primary storage chamber and this water is then discharged into the secondary storage chamber 26. During this discharge, air pressure in the two systems is equalized through the vent tube 27. At the same time the check valve 21 is held closed by the pressure of water above the gate.

The water in secondary storage chamber 26 has a markedly less moment than that in the primary storage chamber and is not sufficient to overcome the natural buoyancy of the gate. Therefore, as soon as the water has run from the primary into the secondary storage chamber, the gate is urged upwardly. While it is possible to adjust the syphon 25 so that its normal period of discharge will be suitable for the passage of a vessel, it is preferred to hold the gate in its lower position by any form of catch, not shown, which may be manually or mechanically operated to release the gate whenever desired.

At the appropriate time the gate is released and rises to an upright position by its own buoyancy. As it does so the water runs from the secondary storage chamber 26 through the vent tube 28 to the vent chamber 29 in which it exerts a moment tending the gate into an upright position. The water remains in the vent chamber 29 until the water level in the lock basin has fallen below the check valve 30, at which time it runs out by gravity. A sill 36 below it acts as a gasket to assist in the prevention of leakage of the water and to avoid entry of dirt and sediment into or about the hinge.

The lower lock gate operates in precisely the same manner as the upper gate except that the opening 19*a* is on the upstream side thereof. This gate, however, must operate in considerably deeper water than the upper gate and the exact positioning of the tanks will not be the same, but the size and position thereof are adapted to perform the same functions as those in the upper tank.

The foregoing detailed description has been given for clearness of understanding only, and no unnecessary limitations should be understood therefrom.

What I claim as new, and desire to secure by Letters Patent, is:

1. A lock gate comprising a gate wall pivotally mounted near its base and having an internal float chamber normally urging the gate to an upright position when submerged and hydrostatic means within the gate including a plurality of intercommunicating fluid storage chambers adapted to store alternately water and air, having an inlet on the control side of the gate and an outlet, said hydrostatic means being proportioned and located to urge the gate from upright position to a submerged position when the water levels on the two sides of the gate are substantially equal, and spontaneously, by flow of fluid between said chambers, to restore buoyancy in the gate when it has reached its minimum submerged position.

2. A lock gate as set forth in claim 1 in which the outlet is substantially below the inlet.

3. A lock gate as set forth in claim 1 in which the gate is automatically restored to upright buoyancy when it has reached the minimum submerged position.

4. A lock gate comprising a gate wall pivotally mounted near its base and having an internal float chamber normally urging the gate to an upright position when submerged, and hydrostatic means within the gate including a plurality of intercommunicating water storage chambers having an inlet on the control side of the gate and an outlet substantially below the inlet, said hydrostatic means being proportioned and located to urge the gate from upright position to a submerged position when the water levels on the two sides of the gate rise to equality, and automatically to restore upright buoyancy in the gate when it has reached its minimum submerged position.

5. A gate as set forth in claim 4, in which the hydrostatic system includes a primary storage chamber located on the upstream side of the pivot and a secondary storage chamber located below the primary storage chamber and representing a substantially less moment arm than the primary storage chamber.

6. A gate as set forth in claim 4, in which the hydrostatic system includes a primary storage chamber located on the upstream side of the pivot and a secondary storage chamber located below the primary storage chamber and representing a substantially less moment arm than the primary storage chamber, and the primary and secondary storage chambers are connected by a siphon which is charged only when the gate has reached substantially its submerged position.

7. A gate as set forth in claim 4, in which the hydrostatic system includes a primary storage chamber located on the upstream side of the pivot and a secondary storage chamber located below the primary storage chamber and representing a substantially less moment arm than the primary storage chamber, the primary and secondary storage chambers are connected by a siphon which is charged only when the gate has reached substantially its submerged position, and means are provided for equalizing air pressure in the primary and secondary storage chambers during discharge of the syphon.

8. A gate as set forth in claim 4, in which the hydrostatic system includes a primary storage chamber located on the upstream side of the pivot and a secondary storage chamber located below the primary storage chamber and representing a substantially less moment arm than the primary storage chamber, the primary and secondary storage chambers are connected by a syphon which is charged only when the gate has reached substantially its submerged position, and the secondary storage chamber communicates, when the gate is in upright position, with a vent chamber still lower in the gate and on the downstream side of the pivot.

9. A gate as set forth in claim 4, in which the gate is adapted for operation on the upstream side of a lock basin and the opening is on the downstream side thereof.

10. A gate as set forth in claim 4, in which the gate is adapted for operation on the downstream end of a lock basin and the opening is on the upstream side of the gate.

CHRISTIAN ARNE.